Jan. 22, 1963   J. JEAN-MARIE J. GERIN   3,074,751
DEFLECTING FENDER DEVICE

Filed March 17, 1959   6 Sheets-Sheet 1

INVENTOR
Jacques Jean-Marie Jules Gerin
By  Karl W. Flocks
ATTORNEY

Jan. 22, 1963   J. JEAN-MARIE J. GERIN   3,074,751
DEFLECTING FENDER DEVICE
Filed March 17, 1959   6 Sheets-Sheet 2
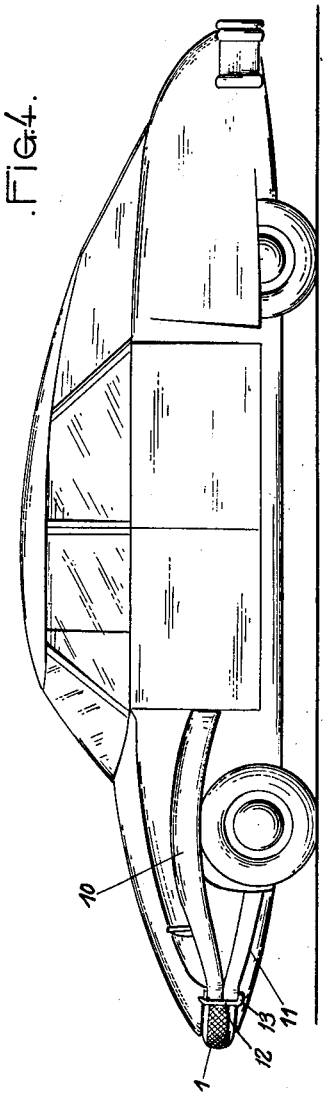
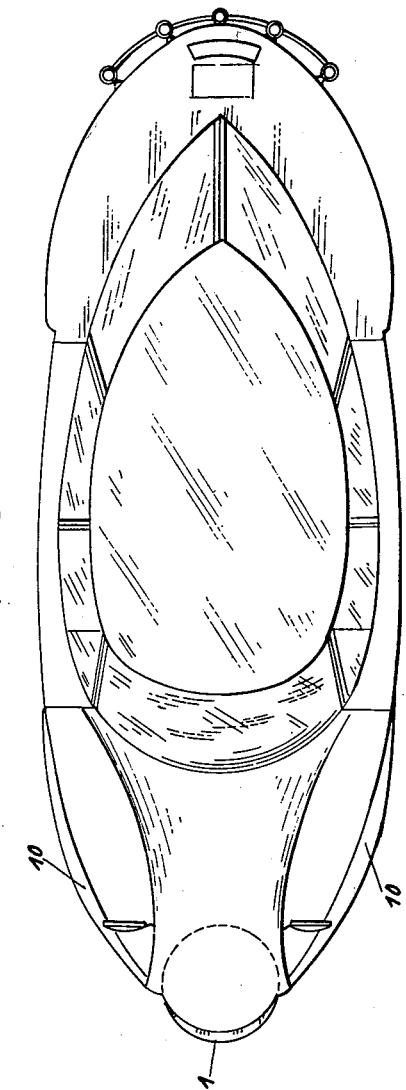
INVENTOR
Jacques Jean-Marie Jules Gerin
By   Karl W. Flocks
ATTORNEY Jan. 22, 1963   J. JEAN-MARIE J. GERIN   3,074,751
DEFLECTING FENDER DEVICE Filed March 17, 1959   6 Sheets-Sheet 3

INVENTOR
Jacques Jean-Marie Jules Gerin
By   KARL W. FLOCKS
ATTORNEY

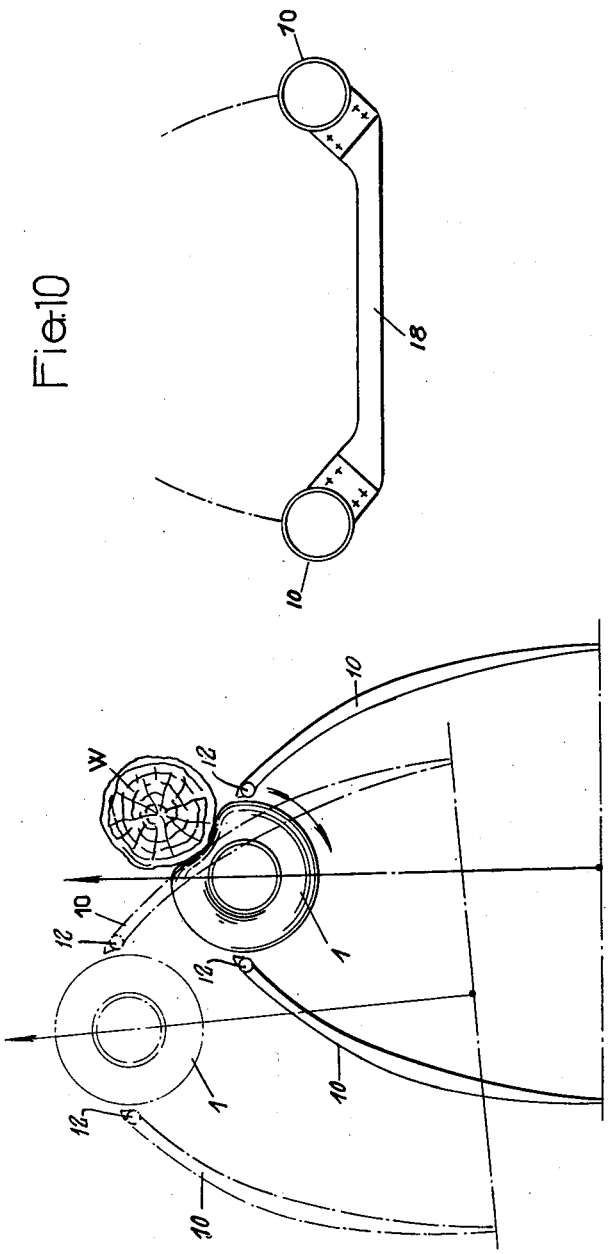

Jan. 22, 1963   J. JEAN-MARIE J. GERIN   3,074,751
DEFLECTING FENDER DEVICE
Filed March 17, 1959   6 Sheets-Sheet 5
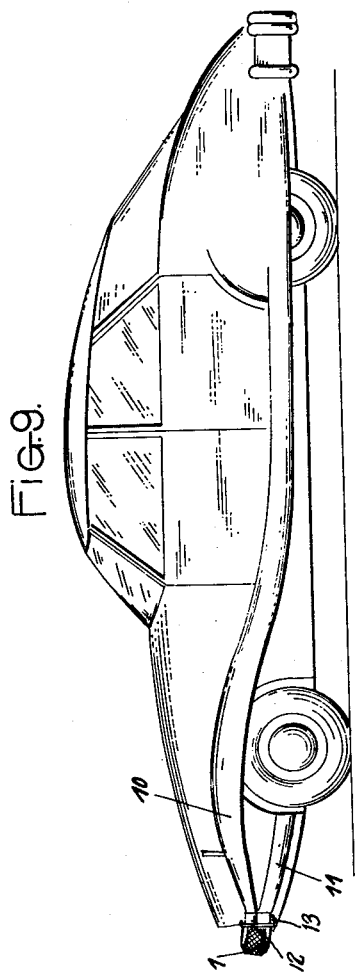
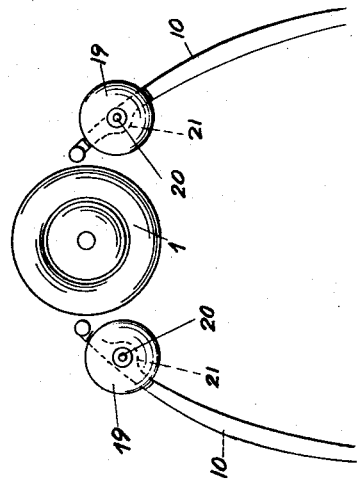
INVENTOR
Jacques Jean-Marie Jules Gerin
BY  Karl W. Flocks
ATTORNEY Jan. 22, 1963   J. JEAN-MARIE J. GERIN   3,074,751
DEFLECTING FENDER DEVICE
Filed March 17, 1959   6 Sheets-Sheet 6

INVENTOR
Jacques, Jean-Marie, Jules Gerin
By   KARL W. FLOCKS
ATTORNEY

United States Patent Office 3,074,751
Patented Jan. 22, 1963

3,074,751
DEFLECTING FENDER DEVICE
Jacques Jean-Marie Jules Gerin, 24 Rue de la Tourelle,
Boulogne-sur-Seine, France
Filed Mar. 17, 1959, Ser. No. 799,967
Claims priority, application France Mar. 26, 1958
5 Claims. (Cl. 293—19)

It would be an impossible task to attempt to eliminate car accidents. Nevertheless, it is possible to reduce the gravity of a car crash, and, even in the most unfavourable circumstances, the present invention helps to avoid a fatal outcome for car occupants, enabling them to escape with mere bruises in a smash which would normally have fatal consequences.

At present, there is no doubt that a direct collision with a tree, or another car travelling in the opposite direction, can only result in the death of the occupants of a vehicle travelling at high speed. Professional racing drivers always do their best during a motor race to avoid a direct collision at all cost, preferring to have their vehicle roll over several times off the road rather than to crash with an almost instantaneous deceleration against a solid obstacle.

The object of the present invention is to deflect a motor vehicle from the obstacle with which it collides, if said obstacle is a pole, a tree or a wall, providing it is not absolutely in the direct path of the vehicle, or in the case of a direct collision with another vehicle provided with that same deflecting device or a not quite direct collision with a conventional vehicle.

The deflecting fender device in accordance with the invention essentially comprises the fifth wheel usually carried as a spare wheel, but firmly secured at the place normally occupied by the front bumper, and freely rotatable, and completed on either side of the vehicle with an upper and lower rubbing beadings which are metallic, simple, double, or multiple.

The wheel preferably fully inflated, will, on meeting the obstacle, roll thereon, and by causing the front of the vehicle to skid will deviate the whole vehicle to the right or to the left.

It will be appreciated that the wheel assembly, i.e. the pneumatic tyre and the wheel proper, is extremely robust and in many an accident in which the vehicle is often entirely destroyed, all four wheels have remained intact.

Moreover, the spare wheel is provided in any case and thus no additional expense is involved in purchasing the main element of this deflecting device.

The character of the invention will not be changed if several wheels are placed one above the other, e.g. the two spare wheels or more of a lorry, a motor bus or a coach.

Further features and advantages of the present invention will become clear on reading the following description, given merely by way of explanation, with reference to the accompanying drawings showing one embodiment of the invention. In these drawings:

FIGURE 3 is a top view of the complete motor car;

FIGURE 4 is a side elevational view of this car;

FIGURE 8 is a diagram showing the operation of the deflecting device according to the invention;

FIGURE 9 is a side elevational view of another motor vehicle;

FIGURE 10 is a detail view showing two chassis-tubes forming the deflection beadings;

FIGURE 11 is a diagrammatic view of an alternative embodiment of the deflecting device in accordance with the invention.

Figure 1:
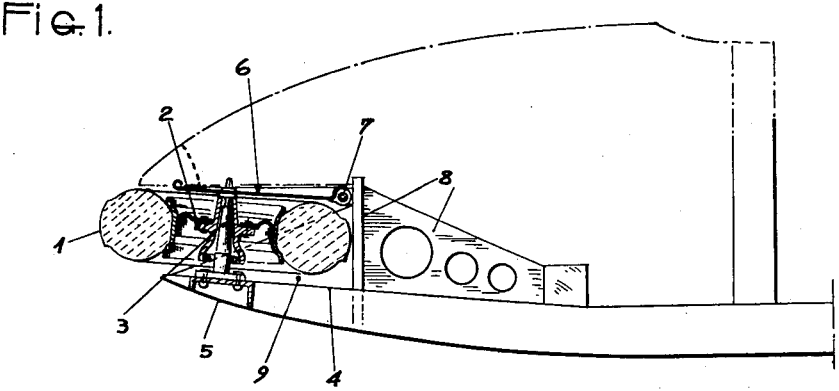
FIGURE 1 is a longitudinal sectional view of the front part of a motor car provided with the deflecting device according to the invention.

The deflecting device for a motor vehicle according to the invention comprises means which are able to deform and roll on the obstacle, and deflecting means.

The first-mentioned means consist of the vehicle spare wheel 1 arranged on the front on a dummy hub 2 normally journaled on a stub axle 3 firmly held by a stationary plate 4 integral by the bottom 5 of the vehicle frame and with a movable plate 6.

Figure 2:
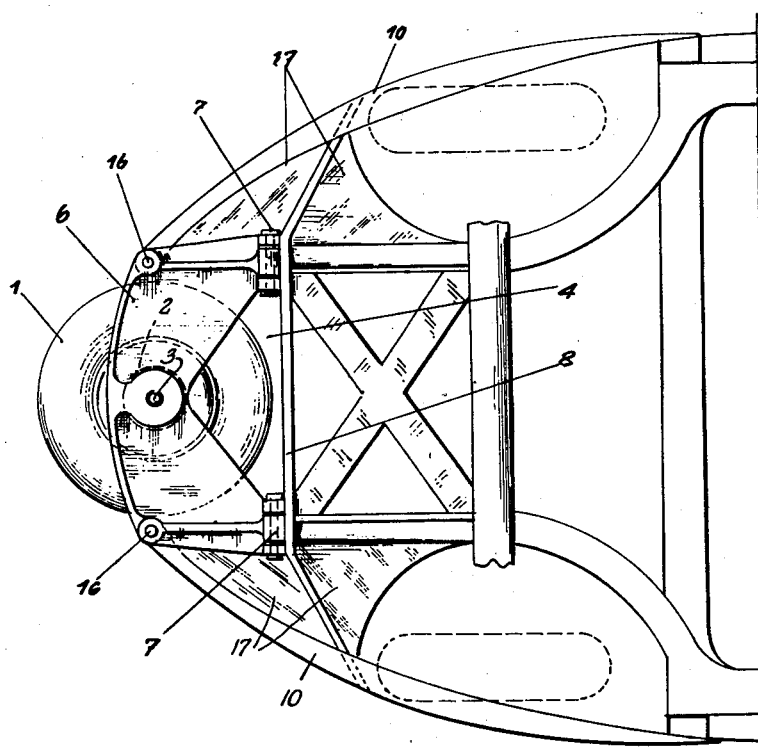
FIGURE 2 is a corresponding top view of the front part of this same motor car.

The movable plate 6 is pivotally connected at 7 on a resistant strut 8. Reinforcing stay-plates 9 are disposed between the bottom plate 4 and the resistant strut 8 (FIGURES 1 and 2).

The deflecting means on either side of the vehicle consists of a solid upper beading 10 and a lower beading 11 (FIGURES 3 to 6). The upper beadings 10 can form a part of the front mudguards of the vehicle.

Between the spare wheel 1 mounted on its stub axle and the deflecting means 10, 11, are disposed guides 12 providing a connection between said spare wheel and said deflecting means. These guides 12 also form the embellishing means hiding the junction between the upper beadings 10 and the lower beadings 11 to the frame-bottom and the upper movable plate 6.

Figure 7:
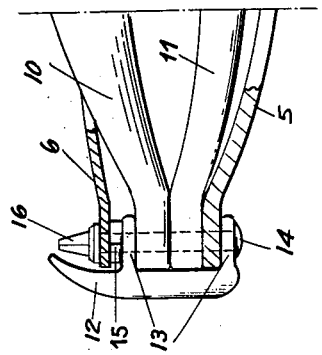
FIGURE 7 is a detail view showing how the upper and lower beadings are secured to the frame-bottom.
Figure 6:
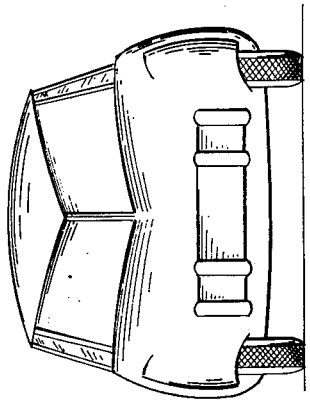
FIGURES 5 and 6 are front and rear views of this car.
Figure 5:
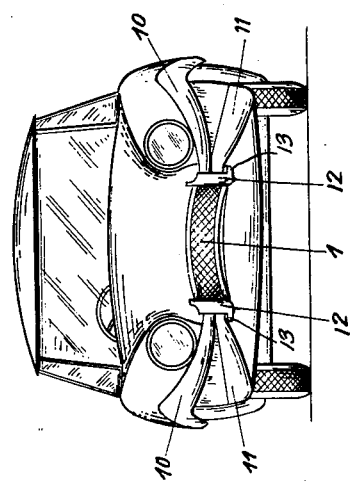
Figure 12:
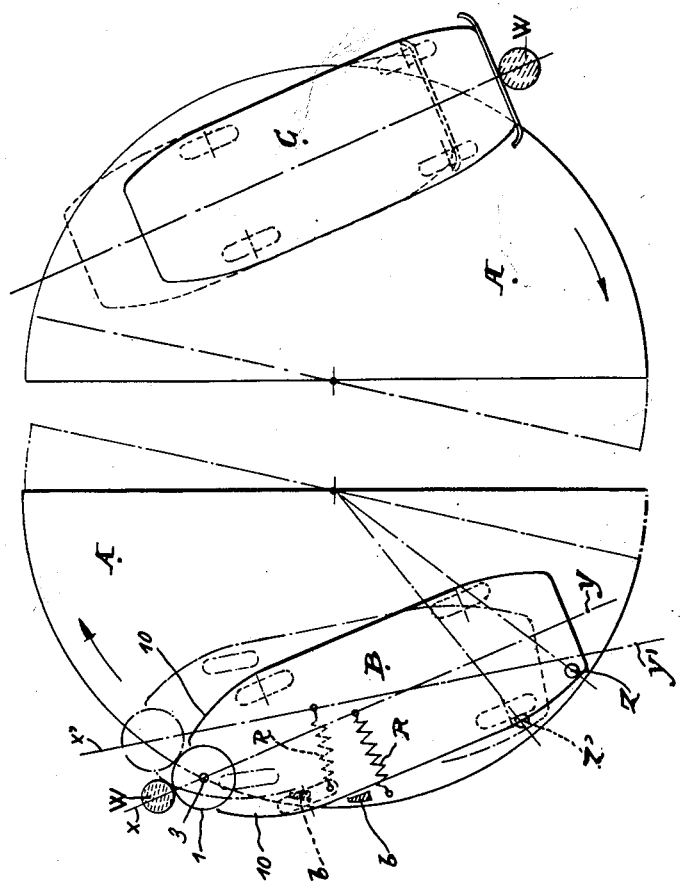
FIGURE 12 is a top view of an experimental test model, used to demonstrate the behaviour of a motor car according to the invention and of a conventional vehicle.

These guides 12 each comprise a bracket 13 embracing the upper beading 10, the lower beading 11 and the frame bottom 5. This assembly has a bolt 14 extending therethrough, onto which is screwed a fixed nut 15. The movable plate 6 can be brought down over said fixed nut 15, and a capping nut 16, enabling the assembly to be dismantled to disengage the spare wheel, is screwed onto the bolt 14 above the movable plate 6 (see FIGURE 7).

The upper beading 10 as well as the lower beading 11 can be held on the vehicle frame and against the resistant front strut 8 by means of reinforcing plates 17 (FIGURE 2).

In FIGURE 9 there is shown a vehicle provided with the deflecting device embodying the invention. This vehicle has an upper beading 10 extending throughout the length of the vehicle to its rear. Each beading 10 of this vehicle can comprise a large tube extending to the rear wheel. Only the outer half-diameter of each tube is to be seen. It is horizontally flattened at the front, then vertically at the level of the front wheel to resume its circular shape under the doors of the vehicle. Both said tubes can form the two main longitudinal members of the chassis, being suitably connected by lower cross-members 18 (FIGURE 10).

Guides 12 can be replaced by rollers 19 providing for transition between the spare wheel and said deflecting means. These rollers can be journaled on spindles 20 integral with a reinforcement 21 of the deflecting members (FIGURE 11).

In the front of a heavy vehicle, such as a lorry, a bus or a motor-coach, having several spare wheels these wheels may be placed in a most advantageous way on the front of the vehicle. A vehicle, with four spare wheels, for example, may have them arranged with one at the top, one at the bottom and the remaining two at their sides on the front end of the vehicle.

The provision of the deflecting device according to the invention leads to the construction of vehicles having novel shapes with excellent streamlining, such as shown in FIGURES 3 to 6 and in FIGURE 9.

The operation of the deflecting device according to the present invention is as follows:

The vehicle strikes a tree—

(1) The tree is distinctly to the right or to the left of the axis of the vehicle, the contact with the tree taking place outside the wheel-diameter, i.e. tangentially along the upper and lower beading, these latter presenting a large angle at the instant of impact. The tree slides and rubs along the length of these metal beadings without catching on them.

On a conventional vehicle, having a plane front extending over the entire width of the car, the tree would necessarily have become embedded between the wheel and the centre of the bumper, which is also plane or insufficiently curved and insufficiently resistant, as no escape to the side would have been possible.

(2) The tree is exactly along the axis of the vehicle, and the tyre, in spite of its being fully inflated, is completely flattened; the shape of the tree trunk is impressed on the inner tube of the tyre so that it crushes the rubberised fabric of the pneumatic tyre against the wheel rim.

A first damping takes place, although it is highly insufficient unless the vehicle were to be travelling at a low speed. There is always a slight side component, whereby the wheel, firmly secured to its hub and capable of pivoting on the stub axle, is rotated and causes the front of the vehicle to skid to the left or to the right, this amounting in fact to the tree being thrown off to the side and, the lateral motion having thus been initiated, the tree will be engaged by the metal sliding elements, along the length of which it will rub and slide as in the first case (FIGURE 8).

It is thus of primary importance for the wheel to be free rotatable while firmly held in place by its pivot or stub-axle, which is strongly secured and connected to the main side-members of the vehicle.

In order to experimentally improve this deflecting device, the following so-called "test-model" method could be used:

On a disc or plate A the vehicle to be tested is placed as at B, journaled on a vertical spindle Z. The front of the vehicle extends clearly beyond the edge of the plate A.

Outside the plate and in proximity to the edge thereof, a pole W is solidly fixed, representing for example a tree. The vehicle and the spindle Z are disposed on the plate so that the longitudinal axis X—Y of the vehicle abuts the pole when the plate is rotated in the direction shown by the arrow. Thus, the point of impact is exactly at the extreme front of the vehicle, in the axis thereof, directly on the pneumatic tyre of the spare wheel.

A stop $b$ limits the angular displacement of the vehicle towards the outside, return means R being provided to retain the vehicle against said stop.

In order to study the behaviour of a conventional vehicle (having a plane front) under the same experimental conditions (striking of the pole or tree against the centre of the bumper), another vehicle C can be symmetrically positioned on the same plate.

In order to enable the disc plate to be continually rotated (this continuous rotation is not prevented by the vehicle having the deflecting device mounted thereon), the conventional vehicle can be withdrawn to its position shown in broken lines.

A test and demonstration program at different rotational speeds can be arranged.

This "testing-model" experiment corresponds fairly accurately to the case of a vehicle having missed a curve and striking a tree outside the curve.

It is to be understood that this description has generally been given merely as an explanation, without any intent of limiting the invention and that various modifications can be made therein without falling outside its scope.

I claim:

1. A deflecting fender device on a vehicle comprising a frame; a bottom plate on said frame; a deflecting wheel unit mounted on said bottom plate including a vertical stub axle integral with said bottom plate, a dummy hub mounted for free rotation about said vehicle stub axle, a wheel proper removably mounted on said dummy hub for free rotation thereabout and projecting slightly from the vehicle, and a movable plate pivotally connected to said frame and secured over said stub axle to hold said wheel on said dummy hub.

2. The deflecting fender device in accordance with claim 1, further including solid deflecting beadings located on each side of said wheel unit.

3. The deflecting fender device in accordance with claim 2, further including a guide member arranged on each side of said wheel unit between said wheel unit and said beading on the corresponding side of said wheel unit, said guide member being a connection between said wheel unit and said beading.

4. The deflecting fender device in accordance with claim 3, further characterized by said guide member being a roller.

5. A deflecting fender wheel unit comprising a mounting means, a resistant strut attached to said mounting means, a vertical stub axle integral with said mounting means, a dummy hub mounted for free rotation about said vertical stub axle, a wheel proper removably mounted on said dummy hub for free rotation thereabout, and a movable plate pivotally connected to said resistant strut and secured over said stub axle to hold said wheel on said dummy hub.

References Cited in the file of this patent

UNITED STATES PATENTS

| | | |
|---|---|---|
| 154,615 | Patton | Sept. 1, 1874 |
| 540,101 | Kelly | May 28, 1895 |
| 896,104 | Guhle | Aug. 18, 1908 |
| 1,100,359 | Ekman | June 16, 1914 |
| 1,753,483 | Stevens | Apr. 8, 1930 |
| 2,077,110 | Johnson | Apr. 13, 1937 |
| 2,177,112 | Johnstone | Oct. 24, 1939 |
| 2,196,225 | Morrison | Apr. 9, 1940 |
| 2,274,440 | Tozier | Feb. 24, 1942 |

FOREIGN PATENTS

| | | |
|---|---|---|
| 282,673 | Great Britain | June 14, 1928 |
| 339,786 | Italy | Apr. 28, 1936 |
| 429,783 | Italy | Feb. 3, 1948 |